United States Patent
Ehrlich et al.

(10) Patent No.: US 7,352,527 B1
(45) Date of Patent: Apr. 1, 2008

(54) DISK DRIVE THAT BALANCES SEEK SPEED AND SEEK ACOUSTICS

(75) Inventors: Richard M. Ehrlich, Saratoga, CA (US); Stephen R. Kennedy, Soquel, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 11/509,324

(22) Filed: Aug. 23, 2006

(51) Int. Cl.
*G11B 5/596* (2006.01)

(52) U.S. Cl. .............................. 360/78.04; 360/78.06; 711/111

(58) Field of Classification Search ............ None
See application file for complete search history.

(56) References Cited

U.S. PATENT DOCUMENTS 6,560,658 B2 * 5/2003 Singer et al. .................. 710/5

\* cited by examiner

*Primary Examiner*—Andrew L. Sniezek
(74) *Attorney, Agent, or Firm*—Myers Bigel Sibley & Sajovec, P.A.

(57) ABSTRACT

A disk drive selects seek speed and seek acoustics based on a history of seek requests from a host computer. The history of seek requests can include time intervals between seek requests, seek lengths of seek requests, locations of seek requests, a backlog of seek requests, whether seek requests are read requests or write requests, and whether seek requests are sequential or random.

19 Claims, 3 Drawing Sheets

US 7,352,527 B1

DISK DRIVE THAT BALANCES SEEK SPEED AND SEEK ACOUSTICS

FIELD OF THE INVENTION

The present invention relates to disk drives, and more particularly to disk drives that perform seek operations with multiple seek speeds.

BACKGROUND OF THE INVENTION

Disk drives include a disk which stores information, a spindle motor that rotates the disk, a head that reads from and writes to concentric tracks on the disk, and an actuator arm assembly that supports the head over the disk and radially positions the head relative to the disk.

Disk drives receive access requests (read requests and write requests) from a host computer that uses the disk drive as a mass storage device. Access requests that require the head to move to another track include seek requests. The head is moved from a start track to a destination track where a desired data sector resides during a seek operation. Thereafter, the head is maintained over the destination track by reading servo information from the destination track during a track following operation, and the disk rotation places the head over the data sector so that the head can access the data sector. The head reads data from the data sector during a read operation, and writes data to the data sector during a write operation. The access time for accessing the data sector includes the seek time for performing the seek operation, the settle time for establishing the track following operation, and the rotational latency time for the disk rotation to place the head over the data sector.

Disk drives are expected to provide increasing higher data transfer rates, which in turn require increasingly lower access times. As a result, disk drives require increasingly higher seek speeds with lower seek times.

Disk drives emit acoustics during disk rotation and seek operations. Unfortunately, disk rotation acoustics and seek acoustics are undesired noise that can bother the end user and disrupt other devices. This creates a tradeoff between seek speed and seek acoustics. Increasing the seek speed increases the seek acoustics, thereby increasing the data transfer rate but creating more noise, whereas decreasing the seek speed decreases the seek acoustics, thereby creating less noise but decreasing the data transfer rate.

Disk drives have been designed to provide different combinations of seek speed and seek acoustics. For instance, a disk drive includes a first servo configuration page for low seek speed and low seek acoustics ("quiet mode"), and a second servo configuration page for high seek speed and high seek acoustics ("fast mode"). The host computer selects between the quiet mode and the fast mode, depending on which mode is best suited for a particular application. For instance, a video playback system may prefer the quiet mode, whereas a personal computer may prefer the fast mode. However, the disk drive is incapable of assisting the host computer with determining which mode should be employed. Instead, the host computer is burdened with selecting the seek speed and seek acoustics and conveying the selection to the disk drive.

Therefore, there is a need for a disk drive that balances seek speed and seek acoustics.

SUMMARY OF THE INVENTION

The present invention provides a disk drive that selects seek speed and seek acoustics based on a history of seek requests from a host computer.

The history of seek requests can include time intervals between seek requests, seek lengths of seek requests, locations of seek requests, a backlog of seek requests, whether seek requests are read requests or write requests, and whether seek requests are sequential or random. The disk drive or the host computer can specify the history of seek requests.

In an embodiment, the disk drive selects a low seek speed with low seek acoustics if a second seek request that exceeds a seek length does not occur during a time interval that begins upon a first seek request that exceeds the seek length, and selects a high seek speed with high seek acoustics if a second seek request that exceeds the seek length occurs during the time interval.

In another embodiment, the disk drive selects a low seek speed with low seek acoustics if a backlog of seek requests does not exceed a threshold, and selects a high seek speed with high seek acoustics if the backlog exceeds the threshold.

Advantageously, the disk drive balances seek speed and seek acoustics for the host computer. Furthermore, the disk drive does so based on seek requests from the host computer without intervention by the host computer.

BRIEF DESCRIPTION OF THE DRAWINGS

These and other features, aspects and advantages of the present invention will become understood with reference to the following description and accompanying figures where.

DETAILED DESCRIPTION OF THE INVENTION

Figure 1:
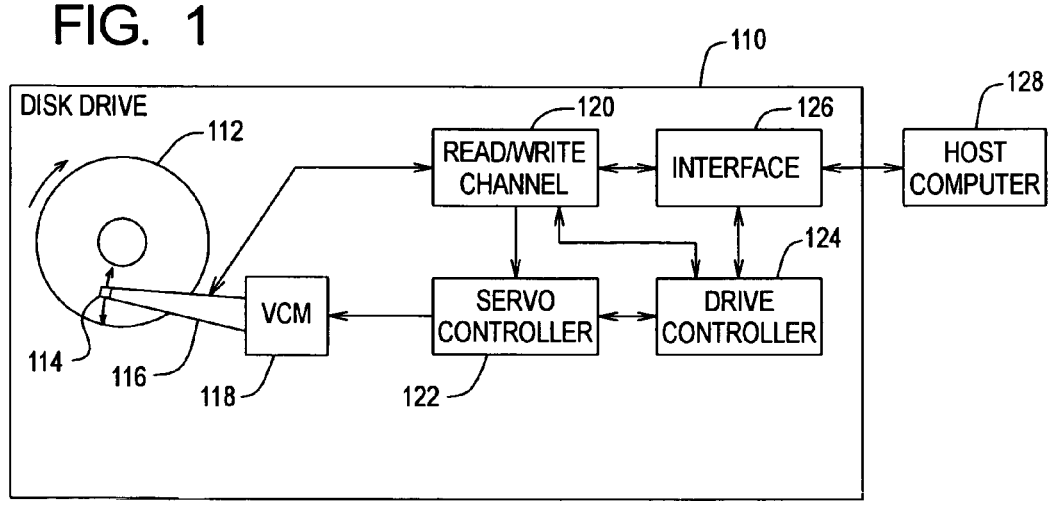
FIG. 1 shows a disk drive in which the present invention can be implemented.

FIG. 1 shows a disk drive 110 in which the present invention can be implemented. The disk drive 110 includes a data storage disk 112, a read/write head 114, an actuator arm assembly 116, a voice coil motor (VCM) 118, a read/write channel 120, a servo controller 122, a drive controller 124 and an interface 126.

The disk drive 110 is coupled to a host computer 128 that uses the disk drive 110 as a mass storage device. The disk drive 110 receives read and write requests from the host computer 128 and carries out the access requests by performing data transfers between the disk 112 and the host computer 128.

The head 114 reads from and writes to the disk 112. The actuator arm assembly 116 supports the head 114 and rotates about a bearing to radially position the head 114 relative to the disk 112. The VCM 118 is attached to the actuator arm assembly 116 and radially positions the head 114 relative to the disk 112 in response to a control signal from the servo controller 122.

The channel 120 transforms data transferred to and from the disk 112. During a write operation, the channel 120 converts digital data received from the host computer 128 into an analog write current for delivery to the head 114. During a read operation, the channel 120 converts an analog read signal from the head 114 into a digital representation that can be recognized by the host computer 128. The channel 120 also separates out servo information read by the head 114 and directs the servo information to the servo controller 122 for positioning the head 114.

The servo controller 122 moves the head 114 from a start track to a destination track during seek operations, and maintains the head 114 over the destination track during track following operations. The servo controller 122 responds to an access request from the host computer 128 that includes a seek request, and the seek request includes a seek length (from the start track to the destination track) and a location (the destination track).

The drive controller 124 is a microprocessor that controls the operations of the disk drive 110.

The interface 126 provides a communications path that includes data buffering between the channel 120 and the host computer 128, and directs commands and requests from the host computer 128 to the drive controller 124. For instance, the interface 126 directs access requests from the host computer 128 to the drive controller 124, which directs the seek requests to the servo controller 122, which places the seek requests in a queue. The backlog of seek requests in the queue corresponds to the workload of the disk drive 110. A large backlog indicates a large workload, whereas a small backlog indicates a small workload.

The disk drive 110 can include multiple disks 112 in a vertical stack and multiple heads 114 supported by multiple actuator arm assemblies 116 with one head 114 for each operative disk surface. Typically, both surfaces of each disk 112 store user data and the disk drive 110 includes two heads 114 for each disk 112. However, single-sided disk arrangements can also be used. Furthermore, the functional blocks (120-126) in the disk drive 110 can be separate chips but do not necessarily represent discrete hardware elements. For example, two or more functional blocks within the disk drive 110 can be implemented in firmware in a common digital processor.

The disk drive 110 determines a seek performance mode by making a tradeoff between seek speed and seek acoustics. The disk drive 110 selects the seek performance mode based on a history of seek requests from the host computer 128. The disk drive 110 applies a set of rules to the history of seek requests to select between a quiet mode (with low seek speed and low seek acoustics) and a fast mode (with high seek speed and high seek acoustics). The disk drive 110 or the host computer 128 can furnish the set of rules that specify the history of seek requests and how it is used to select the seek performance mode.

The history of seek requests can include time intervals between seek requests, seek lengths of seek requests, locations of seek requests, a backlog of seek requests, whether seek requests are read requests or write requests, and whether seek requests are sequential or random. The disk drive 110 selects the quiet mode or the fast mode based on one or more of these parameters.

FIGS. 2-5 show examples in which the disk drive 110 selects the quiet mode or the fast mode based on one or more of these parameters.

Figure 2:
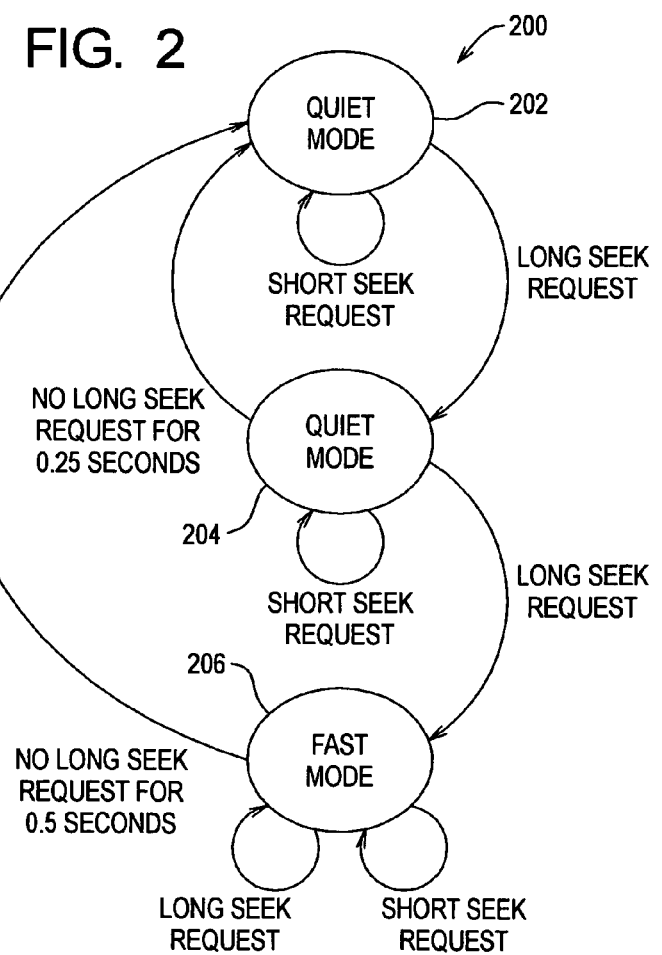
FIG. 2 shows a state diagram for selecting seek speed and seek acoustics using two seek states for the quiet mode and one seek state for the fast mode.

FIG. 2 shows a state diagram 200 for selecting seek speed and seek acoustics using two seek states for the quiet mode and one seek state for the fast mode. The state diagram 200 is implemented by a state machine in the servo controller 122.

The state diagram 200 switches between the quiet mode and the fast mode in response to seek requests from the host computer 128 based on time intervals between the seek requests and seek lengths of the seek requests.

The state diagram 200 includes seek states 202 and 204 for the quiet mode and seek state 206 for the fast mode. The state diagram 200 defines long seek requests as seek requests with a seek length of 3 or more tracks, and short seek requests as seek requests with a seek length of 1-2 tracks. Thus, long seeks exceed 2 tracks, and short seeks do not exceed 2 tracks.

The seek state 202 is an initial seek state that operates in the quiet mode. The seek state 202 transitions to the seek state 204 in response to a long seek request. However, the seek state 202 does not transition to another seek state in response to a short seek request.

The seek state 204 is an intermediate seek state that operates in the quiet mode. The seek state 204 transitions to the seek state 206 in response to a long seek request within 0.25 seconds of the long seek request that caused the seek state 202 to transition to the seek state 204. The seek state 204 transitions to the seek state 202 in response to the absence of a long seek request within 0.25 seconds of the long seek request that caused the seek state 202 to transition to the seek state 204. However, the seek state 204 does not transition to another seek state in response to a short seek request. Thus, the seek state 204 either transitions to the seek state 206 in response to a long seek request that occurs during the 0.25 second interval or transitions to the seek state 202 upon expiration of the 0.25 second interval, regardless of short seek requests during the 0.25 second interval.

The seek state 206 is a final seek state that operates in the fast mode. The seek state 206 remains in the seek state 206 in response to a long seek request within 0.5 seconds of the long seek request that caused the seek state 204 to transition to the seek state 206. The seek state 206 transitions to the seek state 202 in response to the absence of a long seek request within 0.5 seconds of the long seek request that caused the seek state 204 to transition to the seek state 206. Furthermore, the seek state 206 resets the 0.5 second interval to the most recent long seek request that occurs during the seek state 206. Thereafter, if a long seek request occurs within 0.5 seconds of the most recent long seek request then the seek state 206 resets the 0.5 second interval to the most recent long seek request and repeats the process, otherwise the seek state 206 transitions to the seek state 202. However, the seek state 206 does not transition to another seek state in response to a short seek request. Thus, the seek state 206 remains in the seek state 206 in response to each long seek request that occurs during the 0.5 second interval (that begins with the long seek request that moves the seek state 204 to the seek state 206 and is reset by a long seek request that occurs before it expires) or transitions to the seek state 202 upon expiration of the 0.5 second interval, regardless of short seek requests during the 0.5 second interval.

Thus, the state diagram 200 switches from the quiet mode to the fast mode in response to a high frequency of seek requests with long seek lengths, remains in the fast mode in response to maintaining a high frequency of seek requests with long seek lengths, and otherwise operates in the quiet mode.

The state diagram 200 selects the seek performance modes for a sequence of seek requests as illustrated below.

| Seek Request | Seek Length (Tracks) | Seek Type | Time Interval - Previous Seek Request (Seconds) | Time Interval - Most Recent Long Seek Request (Seconds) | Seek State | Seek Performance Mode |
|---|---|---|---|---|---|---|
| 1 | 5 | Long | N/A | N/A | 202 | Quiet |
| 2 | 2 | Short | 0.1 | 0.1 | 204 | Quiet |
| 3 | 8 | Long | 0.3 | 0.4 | 202 | Quiet |
| 4 | 6 | Long | 0.2 | 0.2 | 204 | Quiet |
| 5 | 3 | Long | 0.2 | 0.2 | 206 | Fast |
| 6 | 9 | Long | 0.1 | 0.1 | 206 | Fast |
| 7 | 5 | Long | 0.4 | 0.4 | 206 | Fast |
| 8 | 1 | Short | 0.3 | 0.3 | 206 | Fast |
| 9 | 5 | Long | 0.3 | 0.6 | 202 | Quiet |
| 10 | 6 | Long | 0.8 | 0.8 | 204 | Quiet |

Figure 3:
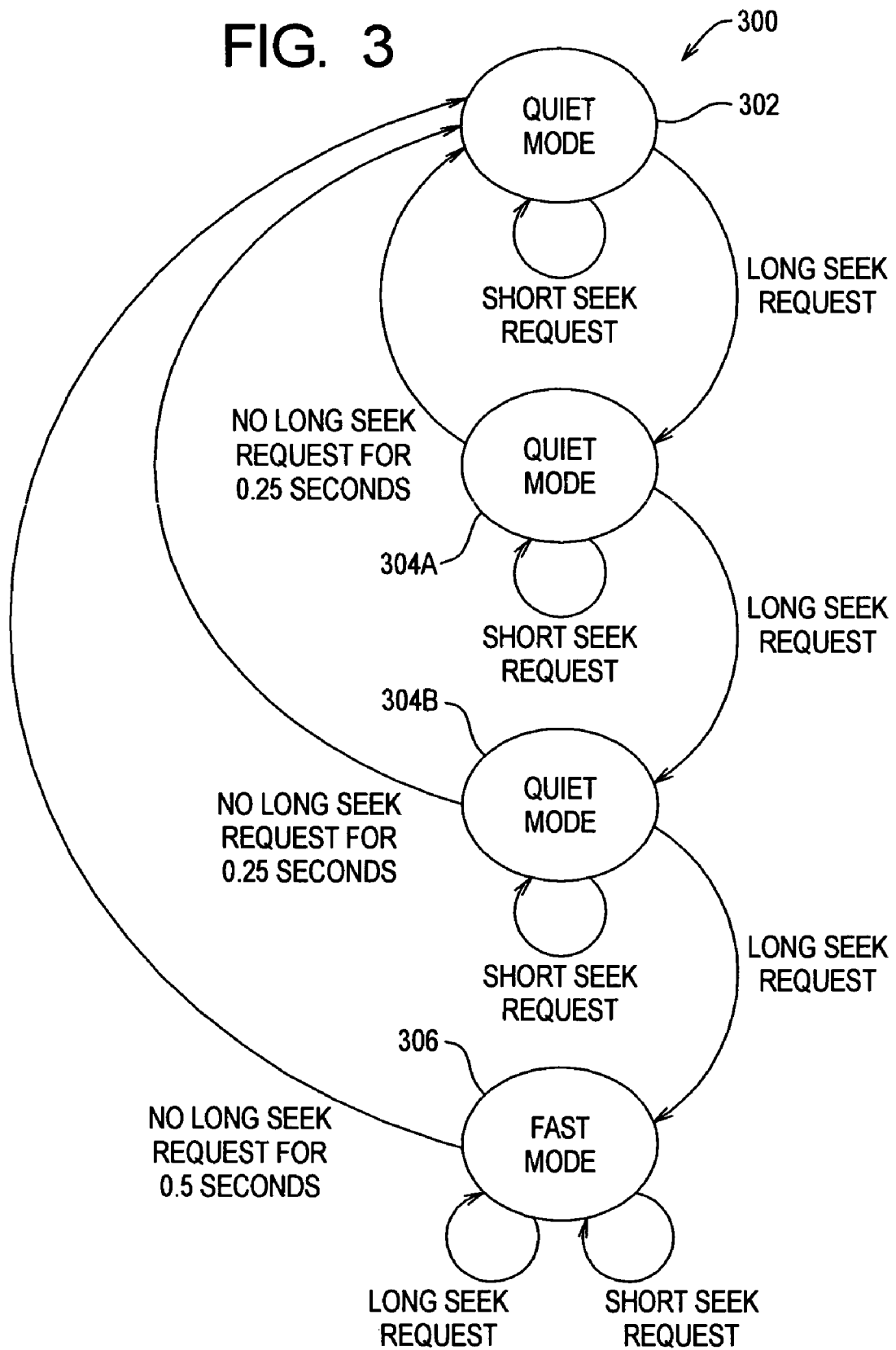
FIG. 3 shows a state diagram for selecting seek speed and seek acoustics using three seek states for the quiet mode and one seek state for the fast mode.

FIG. 3 shows a state diagram 300 for selecting seek speed and seek acoustics using three seek states for the quiet mode and one seek state for the fast mode.

The state diagram 300 is similar to the state diagram 200 except that the state diagram 300 includes two intermediate seek states rather than one. The state diagram 300 includes initial seek state 302 (similar to seek state 202), intermediate seek states 304A and 304B (similar to seek state 204) and final seek state 306 (similar to seek state 206). The seek states 302, 304A and 304B operate in the quiet mode, and the seek state 306 operates in the fast mode.

The seek state 302 transitions to the seek state 304 in response to a long seek request and does not transition in response to short seek requests.

The seek state 304A transitions to the seek state 304B in response to a long seek request within 0.25 seconds of the long seek request that caused the seek state 302 to transition to the seek state 304A, transitions to the seek state 302 if a long seek request does not occur within 0.25 seconds of the long seek request that caused the seek state 302 to transition to the seek state 304A, and does not transition in response to short seek requests.

The seek state 304B transitions to the seek state 306 in response to a long seek request within 0.25 seconds of the long seek request that caused the seek state 304A to transition to the seek state 304B, transitions to the seek state 302 if a long seek request does not occur within 0.25 seconds of the long seek request that caused the seek state 304A to transition to the seek state 304B, and does not transition in response to short seek requests.

The seek state 306 remains in the seek state 306 in response to a long seek request within 0.5 seconds of the long seek request that caused the seek state 304B to transition to the seek state 306, and in response to a subsequent long seek request within 0.5 seconds of the most recent long seek request, transitions to the seek state 302 if a long seek request does not occur within 0.5 seconds of the most recent long seek request, and does not transition in response to short seek requests.

Thus, the state diagram 300 requires more long seek requests than the state diagram 200 before the state diagram 300 switches from the quiet mode to the fast mode.

The state diagram 300 selects the seek performance modes for a sequence of seek requests as illustrated below.

| Seek Request | Seek Length (Tracks) | Seek Type | Time Interval - Previous Seek Request (Seconds) | Time Interval - Most Recent Long Seek Request (Seconds) | Seek State | Seek Performance Mode |
|---|---|---|---|---|---|---|
| 1 | 5 | Long | N/A | N/A | 302 | Quiet |
| 2 | 2 | Short | 0.1 | 0.1 | 304 | Quiet |
| 3 | 8 | Long | 0.3 | 0.4 | 302 | Quiet |
| 4 | 6 | Long | 0.2 | 0.2 | 304A | Quiet |
| 5 | 3 | Long | 0.2 | 0.2 | 304B | Quiet |
| 6 | 9 | Long | 0.1 | 0.1 | 306 | Fast |
| 7 | 5 | Long | 0.4 | 0.4 | 306 | Fast |
| 8 | 1 | Short | 0.3 | 0.3 | 306 | Fast |
| 9 | 5 | Long | 0.3 | 0.6 | 302 | Quiet |
| 10 | 6 | Long | 0.8 | 0.8 | 304A | Quiet |

Figure 4:
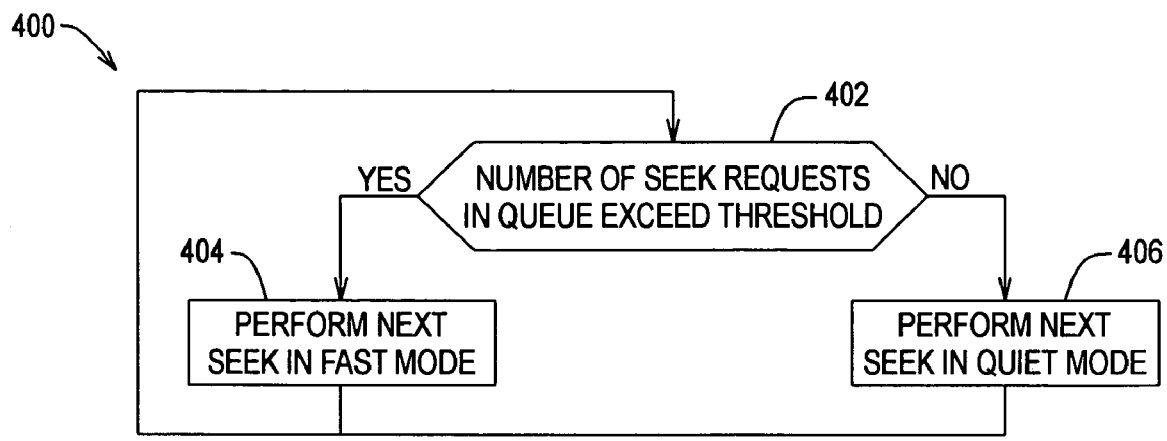
FIG. 4 shows a flow chart for selecting seek speed and seek acoustics using a backlog of seek requests.

FIG. 4 shows a flow chart 400 for selecting seek speed and seek acoustics using a backlog of seek requests.

The seek requests are stored in a FIFO command queue in the servo controller 122. The seek requests enter a first end of the queue as they arrive from the host computer 128, and exit a second end of the queue to perform seek operations. The queue has a maximum depth of 16.

The servo controller 122 switches between the quiet mode and the fast mode in response to the number of seek requests in the queue. The servo controller 122 defines a high workload as 9-16 seek requests in the queue, and a low workload as 0-8 seek requests in the queue. Thus, a high workload exceeds 8 seek requests in the queue, a low workload does not exceed 8 seek requests in the queue, and the workload threshold is 8 seek requests.

When the next seek request is ready to be drawn from the queue to perform a seek operation, it is determined whether the number of seek requests in the queue exceeds the threshold (step 402). If so, the seek operation specified by the next seek request is performed in the fast mode (step 404). Otherwise, the seek operation specified by the next seek request is performed in the quiet mode (step 406).

Thus, the flow chart 400 switches from the quiet mode to the fast mode in response to a high backlog of seek requests, remains in the fast mode in response to maintaining a high backlog of seek requests, and otherwise operates in the quiet mode. As a result, the disk drive 110 selects high seek speed with high seek acoustics under a heavy workload, and selects low seek speed with low seek acoustics under a light workload.

Figure 5:
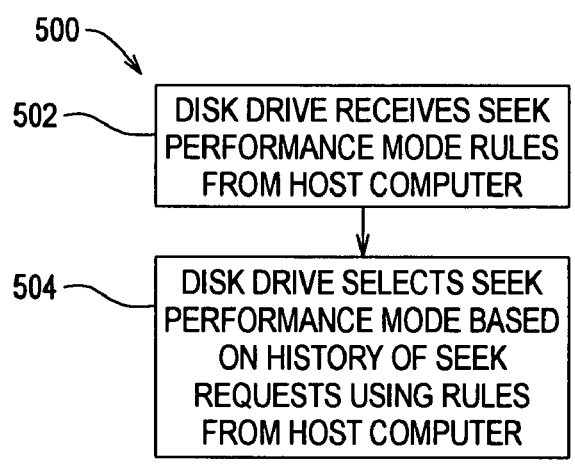
FIG. 5 shows a flow chart for selecting seek speed and seek acoustics using a history of seek requests as specified by a host computer.

FIG. 5 shows a flow chart 500 for selecting seek speed and seek acoustics using a history of seek requests as specified by the host computer 128.

The disk drive 110 receives a set of rules from the host computer 128 on how to select the quiet mode or the fast mode based on a history of seek requests using one or more of the parameters mentioned above (step 502). For instance, the disk drive 110 can receive rules to implement the state diagram 200, the state diagram 300 or the flow chart 400, either with or without additional constraints by the host computer 128. The disk drive 110 receives the rules before the seek requests that shall be monitored in accordance with the rules are received. For instance, the disk drive 110 can receive the rules as it powers-up and updated rules during normal operation.

The disk drive 110 then automatically determines the seek performance mode for the seek requests from the host computer 128 using the rules previously received from the host computer 128 without further intervention by the host computer 128 (step 504).

Thus, the flow chart 500 enables the end user to specify how the disk drive 110 selects between the quiet mode and the fast mode for a particular application and then has the disk drive 110 (rather than the host computer 128) perform the selection during subsequent seek requests.

The disk drive 110 can control the seek speed by controlling the feed forward current that the servo controller 122 sends to the VCM 118. For instance, the disk drive 110 can store a first head radial velocity profile for the low seek speed and a second head radial velocity profile for the high seek speed, and select the desired velocity profile to provide the feed forward current. Likewise, the disk drive 110 can calculate the feed forward current based on the seek length and the seek performance mode. Further details regarding feed forward current are described in U.S. Pat. No. 5,005,089 which is incorporated herein by reference.

The disk drive 110 can select the seek performance mode by predicting upcoming seek requests based on the history of seek requests. For instance, the disk drive 110 can recognize the seek request pattern of a video playback system in which two data streams require a long seek followed by a head switch in each disk revolution for several disk revolutions followed by another long seek followed by a head switch in each disk revolution for several disk revolutions, and so on. The disk drive 110 then selects the seek performance mode in response to the predicted upcoming seek requests to be as quiet as possible during the predicted upcoming workload.

The present invention is not limited to the examples illustrated above. For instance, the disk drive 110 can select between three or more seek performance modes with varying degrees of seek time and seek acoustics. The disk drive 110 can use the same or different time intervals and the same or different seek lengths for different seek states and for different seek performance modes. The seek states can transition to the same or different seek states if their respective time intervals expire without a seek request with sufficient seek length. Likewise, the seek states can employ various time intervals, seek lengths and transition criteria. For instance, the first 3 seeks after 0.5 seconds without any seek requests can be performed in the fast mode and then the next seek after 0.1 seconds without any seek requests can be performed in the quiet mode.

The examples and the parameters mentioned above can be combined with one another. For instance, the disk drive 110 can select between the quiet mode and the fast mode based on time intervals between the seek requests and seek lengths of the seek requests when the backlog of seek requests exceeds the threshold and select the quiet mode when the backlog of seek requests does not exceed the threshold. Likewise, the disk drive 110 can select the fast mode when the backlog of seek requests exceeds the threshold and select between the quiet mode and the fast mode based on time intervals between the seek requests and seek lengths of the seek requests when the backlog of seek requests does not exceed the threshold.

Furthermore, the high and low seek speeds, the high and low seek acoustics, the heavy and light workloads, the fast and slow performance modes and the quiet and noisy performance modes are relative to one another. For instance, the high and low seek speeds may be considered fast for some applications and slow for other applications, and the high and low seek acoustics may be considered loud for some applications and silent for other applications.

The present invention has been described in considerable detail with reference to certain preferred versions thereof, however other versions are possible. Therefore, the spirit and scope of the appended claims should not be limited to the description of the preferred versions contained herein.

What is claimed is:

1. A method comprising:
    determining a history of seek requests from a host computer for seeking a head relative to a disk; and
    determining a speed for seeking the head based on the history of seek requests, wherein determining the history of seek requests includes determining time intervals between seek requests.

2. The method of claim 1, wherein determining the history of seek requests includes determining seek lengths of seek requests.

3. The method of claim 1, wherein determining the history of seek requests includes determining locations of seek requests.

4. The method of claim 1, wherein determining the history of seek requests includes monitoring seek requests in a manner specified by the host computer.

5. The method of claim 1, wherein determining the seek speed includes predicting upcoming seek requests based on the history of seek requests.

6. A method comprising:
    determining a history of seek requests from a host computer for seeking a head relative to a disk; and
    determining a speed for seeking the head based on the history of seek request, wherein determining the history of seek requests includes determining a backlog of seek requests.

7. In a disk drive that includes a disk, a head that reads from and writes to the disk, and a servo controller that moves the head relative to the disk during seek operations in response to seek requests from a host computer, method of determining a seek speed for a seek operation, comprising:
    determining a history of seek requests from the host computer that includes time intervals between seek requests and seek lengths of seek requests; and
    selecting between a high seek speed with high seek acoustics and a low seek speed with a low seek acoustics based on the history of seek requests.

8. The method of claim 7, wherein determining the history of seek requests includes determining a backlog of seek requests.

9. The method of claim 7, wherein determining the history of seek requests includes monitoring seek requests in a manner specified by the host computer.

10. The method of claim 7, wherein determining the seek speed includes predicting upcoming seek requests based on the history of seek requests.

11. A method comprising:
    providing a first seek state with low seek speed and low seek acoustics, wherein the seek moves a head relative to a disk;
    moving from the first seek state to a second seek state with low seek speed and low seek acoustics if a seek request from a host computer that exceeds a first seek length occurs during the first seek state;
    moving from the second seek state to another seek state with low seek speed and low seek acoustics if a seek request that exceeds a second seek length does not occur during a first time interval that begins upon the seek request that moves the first seek state to the second seek state;

moving from the second seek state to a third seek state with high seek speed and high seek acoustics if a seek request that exceeds the second seek length occurs during the first time interval;

remaining in the third seek state if a seek request that exceeds a third seek length occurs during a second time interval that begins upon the seek request that moves the second seek state to the third seek state, and upon a seek request that exceeds the third seek length during the third seek state; and moving from the third seek state to another seek state with low seek speed and low seek acoustics if a seek request that exceeds the third seek length does not occur during the second time interval.

12. The method of claim 11, wherein the second seek state moves to the first seek state if a seek request that exceeds the second seek length does not occur during the first time interval, and the third seek state moves to the first seek state if a seek request that exceeds the third seek length does not occur during the second time interval.

13. The method of claim 11, wherein the second seek state moves to a fourth seek state if a seek request that exceeds the second seek length does not occur during the first time interval, and the third seek state moves to the fourth seek state if a seek request that exceeds the third seek length does not occur during the second time interval.

14. The method of claim 13, wherein the first seek state moves to the fourth seek state if a seek request that exceeds a first seek length does not occur during a third time interval that begins upon a seek request that moves the fourth seek state to the first seek state, and the first seek state moves to the second seek state if a seek request that exceeds the first seek length occurs during the third time interval.

15. The method of claim 11, wherein the first and second seek states are slow and quiet, and the third seek state is fast and noisy.

16. The method of claim 11, wherein the first and second seek states have identical seeks speeds and seek acoustics.

17. The method of claim 11, wherein the first, second and third seek lengths are identical.

18. The method of claim 11, wherein the first time interval is less than the second time interval.

19. The method of claim 11, including remaining in the second seek state if a seek request that does not exceed the second seek length occurs during the second seek state.

* * * * *